Oct. 29, 1963   R. A. MUNSE   3,108,371
METHOD OF MAKING SHEET METAL FASTENER
Filed Nov. 16, 1959   3 Sheets-Sheet 1

INVENTOR.
ROBERT A. MUNSE
BY
Malcolm W. Fraser
ATTORNEY

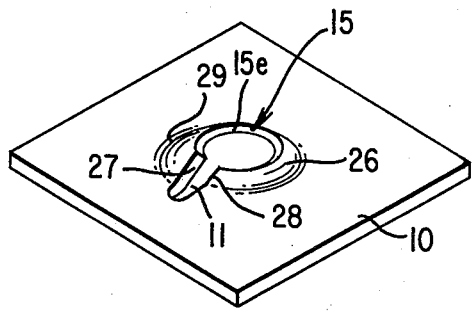
Fig. 6
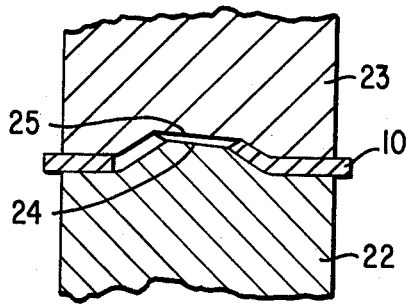
Fig. 7
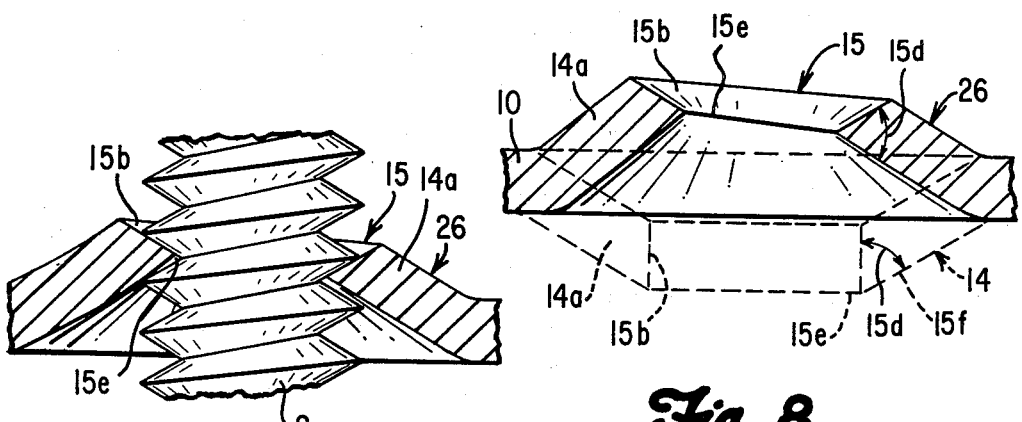
Fig. 9
Fig. 8
INVENTOR.
ROBERT A. MUNSE

INVENTOR.
ROBERT A. MUNSE
BY
ATTORNEY 3,108,371
METHOD OF MAKING SHEET METAL FASTENER
Robert A. Munse, Perrysburg, Ohio, assignor to The Bishop and Babcock Corporation, Cleveland, Ohio, a corporation of Ohio
Filed Nov. 16, 1959, Ser. No. 853,297
8 Claims. (Cl. 29—532)

This invention relates to sheet metal fasteners for screw or stud engagement and is particularly directed to the method of making same. In one aspect the invention is concerned with fasteners of the general types shown in U.S. Patents 2,831,388, dated April 22, 1958; 1,547,628, dated July 28, 1925; and 1,971,881, dated August 28, 1934.

It is a desideratum to produce a fastener of the above type which can be economically and efficiently produced on a quantity production basis and has greater strength than is characteristic in prior structures of somewhat similar form. It is important to make possible the use of thicker or heavier metal for a selected screw and to achieve thread engagement by the fastener which not only extends to or closely approaches the root of the screw, but has such engagement that liability of shearing the ends or crests of the threads of the screw under load is obviated. It is further desired that the size of the screw which the sheet metal fastener is intended to engage shall not govern the thickness of the metal from which the fastener is formed, thus making possible the use of thicker or heavier gauge sheet metal with the result that a much more satisfactory fastener is produced whose field of usefulness is substantially increased. It is further desired to improve the strength characteristics of plain stud engaging fasteners as well as to increase the efficiency of the method of producing same.

Another object is to produce a new and improved method for producing the above fasteners which is efficient and economical and lends itself satisfactorily to large quantity production.

Other objects and advantages of the invention will hereinafter appear, and for purposes of illustration but not of limitation, embodiments of the invention are shown on the accompanying drawings in which:

FIGURE 6 is a perspective view of the completed fastener by which the metal is inverted or pressed from the form according to FIGURE 3 to the opposite side of the sheet metal piece;

FIGURE 7 is a fragmentary vertical sectional view showing the die set for completion of the formation of the fastener as shown in FIGURE 6;

FIGURE 8 is a fragmentary vertical sectional view of the completed fastener and showing by broken lines the position of the protuberance before the final inversion step which is shown by full lines;

FIGURE 9 is a fragmentary vertical sectional view of the completed fastener and showing the manner in which the edge portion of the hole engages the threads of the fastener;

Figures 10, 11:
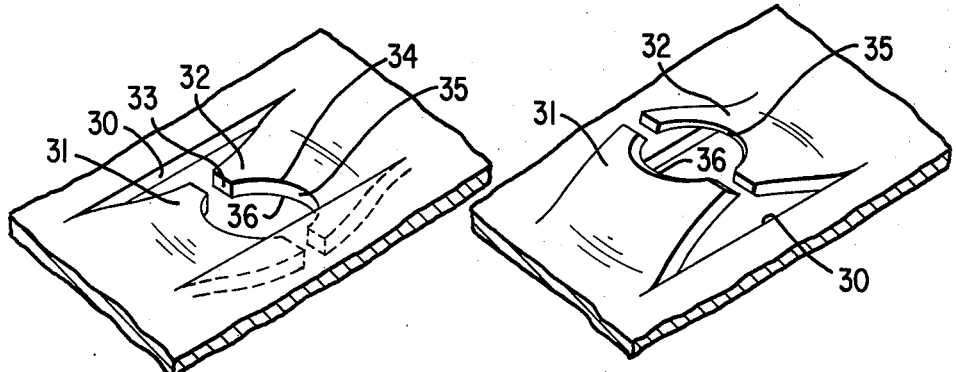
FIGURES 10 and 11 are fragmentary perspective views of another form of screw-engaging fastener embodying a pair of tongues showing successively the steps of producing the fastener by inversion similar to the fastener according to FIGURES 1 to 9.
Figures 12, 13:
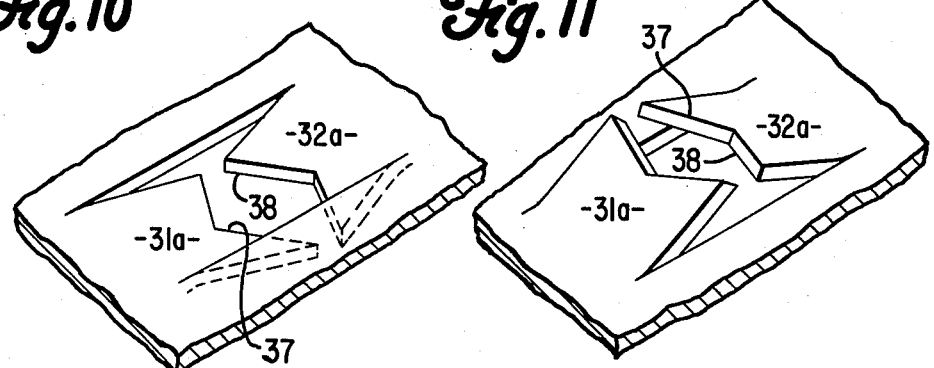
Figures 14, 15:
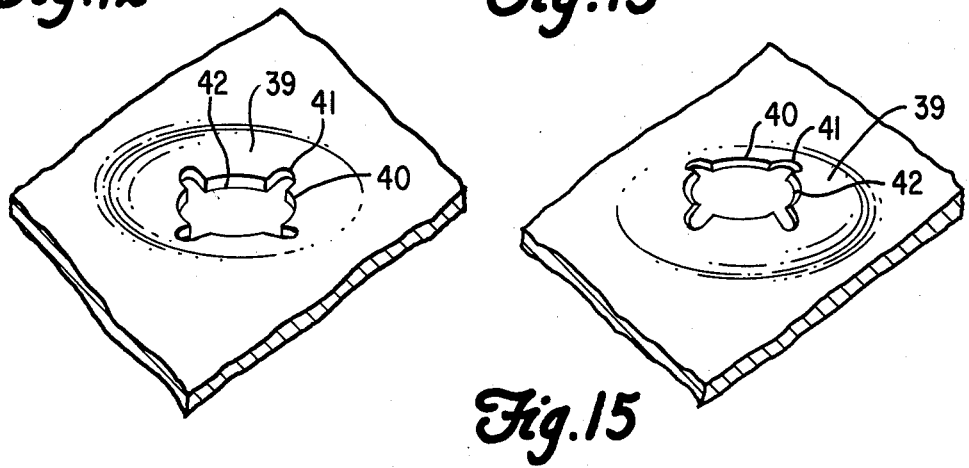

FIGURES 12 and 13 are fragmentary perspective views of a fastener similar to that of FIGURES 10 and 11 also showing the successive steps in making same, such fastener being for biting engagement with a plain shank stud; and FIGURES 14 and 15 are fragmentary perspective views showing the successive steps also involving the inversion feature, in producing a predominantly round sheet metal fastener.

Figure 1:
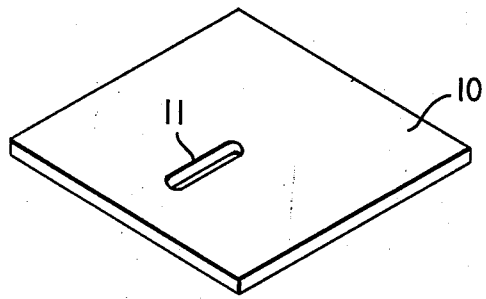
FIGURE 1 is a perspective view of a piece of flat sheet metal in which an elongate slot is formed representing the first step in the production of the fasteners.
Figure 2:
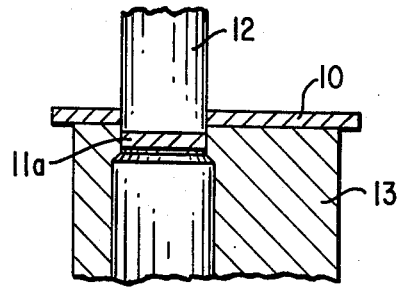
FIGURE 2 is a fragmentary sectional view showing the die set by which the slot shown in FIGURE 1 is punched out.

Referring to the drawings, FIGURE 1 shows a piece of sheet metal designated at 10 which is flat on both sides and in which is formed an elongate relatively narrow slot 11 rounded at opposite ends. FIGURE 2 shows a die set for forming the slot 11, which consists of an apertured base die 13 with which a punch 12 cooperates to strike out a slug 11a to form the slot 11.

Figure 3:
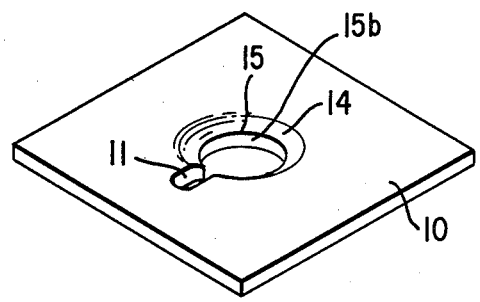
FIGURE 3 is a perspective view of a piece of flat sheet metal in which the second step in the formation of the fastener is illustrated, the metal at one side of a portion of the slot being countersunk to form a protuberance with a hole formed centrally thereof.

FIGURE 3 illustrates the next step in the formation of the fastener in which a protuberance 14 is pressed or countersunk from the upper surface of the sheet metal piece 10, the same having a uniform frusto-conical form which is split by the slot 11, the walls 15b being substantially straight. The impression is formed with a centrally disposed round aperture 15.

Figure 4:
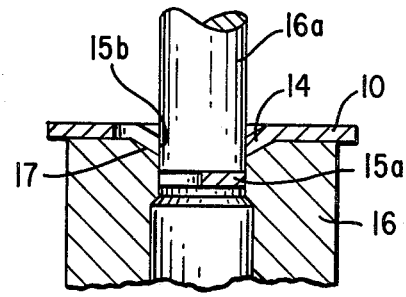
FIGURE 4 is a fragmentary vertical sectional view showing the die set employed in producing the structure according to FIGURE 3.

FIGURE 4 shows a die set for producing the form according to FIGURE 3 and consists of an apertured base element 16 having a flat top on which the flat sheet metal piece 10 rests. Around the aperture is a conical countersunk depression 17. 16a represents the round punch to form the hole 15 and to force the metal into the countersink 17, 15a representing the punched out portion forming the hole.

Figure 5:
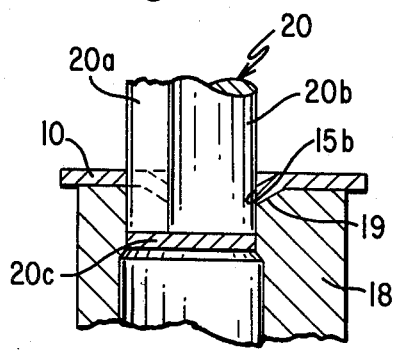
FIGURE 5 is a fragmentary sectional view of a die set and showing the method of combining the slotting and hole punching and countersinking steps according to FIGURES 2 and 4.

The two operations shown in FIGURES 2 and 4 may be combined into a single operation as shown in FIGURE 5 in which there is a die 18 formed with a countersunk conical depression 19. The male portion of the die set is shown at 20 and has a slot punching portion 20a and a countersink and round hole punching portion 20b, the punched out portion being indicated at 20c. Manifestly the end result of the die set shown in FIGURE 5 will be the form of the fastener as shown on FIGURE 3.

The edge wall of the hole 15 which may be designated as 15b as produced by the above step is at an angle of 90° to the plane of the flat base 10, although at a considerably less angle to that of the walls of the countersunk impression 14.

In the final step of forming the fastener, the impression as shown on FIGURE 3, which extends toward the underside of the sheet metal piece 10, is inverted or pressed to the upper or opposite side of the sheet metal piece 10, as indicated in FIGURE 6. Thus a complete inversion of the fastener element is achieved and the completed screw engaging protuberance projects from the upper side of the sheet metal piece 10 instead of from the lower side thereof. A die set for accomplishing this final step is shown in FIGURE 7 in which there are mating die parts 22 and 23, the lower die 22 having the male forming part 24 and the upper die 23 having the female forming part 25.

By referring to the broken line showing on FIGURE 8, it will be seen that before inversion, the impression has a round hole, the walls 15b of which are at 90° to the horizontal or the plane of the flat base 10 and a sharp edge 15e is formed at the juncture of the aperture wall 15b and the outer sloping wall 15f of the impression.

The angle comprehended between the walls 15b and 15f is indicated at 15d, and although this angle may vary, for practical purposes it should be between 50° and 70° for satisfactory screw thread accommodation. When the impression is inverted to the full line position of FIGURE 8, the angle 15d remains substantially unchanged and the edge 15e which is transformed from an outer edge to an inner edge, forms a substantially sharp edge to enter between the threads of a screw applied thereto. In order to accommodate the pitch of a sheet metal screw S, the edge 15e when inverted is formed into a helix, the slot 11 defining an edge 27, the outer end of which is higher than the outer edge 28. In other words, the metal at one side of the slot 11 is bent outwardly from the plane of the flat surface of the sheet metal piece 10 on a radius of gyration greater than that of the metal on the other side of the slot. It will be understood that the base 29 of the impression represents a one turn spiral and the locus of the axis of gyration of elements of the metal of the impression taken at successive radials around the aperture. The impression 26 is helicoid rather than strictly conical and dies 22 and 23 are designed to form the completed fastener as shown on FIGURE 6.

The importance of the edge 15e of the hole 15 and the angle 15d are depicted on FIGURE 9 from which it will be observed that this edge portion extends well into the root of the screw S. Thus the force of the threads of the screw when it is tightened against the fastener is directed tensilely against the flat wall or face 15b of the edge and thence to the walls 14a in straight line fashion. This constitutes a substantial improvement over similar fasteners in which the edge of the hole was in shear engagement with the threads of the screw and as a result not infrequently the crests of the teeth of the screw are sheared when the parts are sufficiently loaded. Another important advantage of this fastener is that it enables the use of heavier gauge metal for a particular screw and, as a result it is not necessary to govern the thickness of the metal for a particular pitch of screw.

Heretofore there was a definite limit of the thickness of the metal for a fastener of this type, such thickness being of the order of one-half the pitch of the screw. To illustrate this difference, heretofore it was necessary to make a 5/16–18 thread form fastener of .025″ thickness of metal for application to a torque of approximately 56 inch pounds while the same thread form can be used in accordance with the above described improvement to afford a torque reading of 180 inch pounds with .059″ thickness of metal so that an increase of strength of better than 300% is achieved. Thus not only can heavier gauge metal be employed in order greatly to increase the strength of the sheet metal fastener for a particular screw but even with the same gauge of metal as employed with former fasteners of this type, substantially increased strength is assured.

FIGURES 10 and 11 illustrate another form of sheet metal fastener incorporating features of the invention as above described. In this form a pair of laterally spaced parallel lances or cuts 30 are made in the flat sheet metal piece. Between these lances are a pair of tongues 31 and 32 which are integral with the sheet metal piece at the rear ends, the inner ends being severed from each other by straight edge cuts 33 at the sides and a round hole being punched from the central portion forming arcuate notches 34 in the free ends of each of the tongues. It is to be understood that the same procedure as above described is followed here involving the pressing of the metal downwardly and thereafter punching the hole or arcuate notch portions 34, the wall 35 of each of the notch portions being at 90° to the horizontal plane of the metal as above described and obtaining here also the angle, such as 15d above described, between the lower edge 36 of the hole and the outer wall of the respective tongue. Thereafter the tongues 31 and 32 are inverted or forced to the opposite side of the sheet metal piece, as indicated in FIGURE 11. In this manner the edge 36 of each of the notches 34 is disposed similarly to the edge 15e above described. At the same time the dies which invert the tongues to this position also impart a substantially helical form to the notch portions for enabling them properly to engage a screw thread. Manifestly the same advantages are achieved with this form of fastener as in the fastener described in connection with the form illustrated on FIGURES 1 to 9.

FIGURES 12 and 13 show a form similar to that shown in FIGURES 10 and 11 except that instead of arcuate notches being formed in the ends of the tongues, in this instance the tongues 31a and 32a are formed with V-shaped notches 37. The metal is punched out in forming the notches when the tongues are in the form shown in FIGURE 12 pressed to one side of the sheet metal piece. Thereafter the tongues are inverted by die sets to the form shown in FIGURE 13 in which the lower edge of each of the notches 37 is disposed similarly to the edge 15e hereinbefore described. The angle between the edge 38 corresponds to that of 15d hereinbefore described. This form of fastener is particularly adapted for impinging engagement with a plain shank stud although by imparting a somewhat helical form to the two V-shaped notches, the same is adapted for screw-thread engagement as will be readily understood. Thus the invention is not restricted solely to the formation of fasteners for screw thread engagement but is also applicable to stud engaging fasteners. The advantage in the latter case is that a substantially knife edge or line contact is established between the fastener and the plain shank of the stud. Thus a sharp, sturdy two prong or tongue structure can be provided in an extremely simple manner without the necessity of swaging or coining operation.

A still further form of fastener is illustrated on FIGURES 14 and 15 in which a substantially round or dome-shaped impression 39 is pressed from a flat surface of a sheet metal piece. After the metal is pressed to this form, a hole 40 is punched out. This hole is round except for four equidistantly spaced notches 41 which result in the provision of four equidistantly spaced tongues. Each of these tongues is provided with a lower edge portion 42. Thereafter the impression is inverted or forced to the opposite side of the sheet metal piece as shown in FIGURE 15. This results in the provision of the lower edge 42 being inclined inwardly and the upper edge inclined outwardly similar to the form described in connection with FIGURES 1 to 9. This form may be employed for plain stud engagement or by imparting a substantially helical form to the edge portion of the hole 40 by the die set achieving the inversion, the same may be adapted for screw thread engagement. It will be manifest that this form of fastener has the same advantageous features which have been described in connection with the form according to FIGURES 1 to 9.

Numerous changes in details of construction, arrangement and operation may be effected without departing from the spirit of the invention, especially as defined in the appended claims. The expression "slot" employed herein is intended also to cover a slit.

What I claim is:

1. The method of forming a sheet metal fastener which consists in pressing from one side of a piece of sheet metal a form of the general shape of the finished fastener, punching an aperture in said form so that the wall of the aperture provides with the adjacent outer wall of the form an angle of the order of 60°, and then inverting the form by pressure to a similar position on the opposite side of the sheet metal piece, whereby the outer edge of the punched aperture becomes the inner edge of the hole upon inversion and said angle remains approximately the same, the wall of the aperture inclining upwardly and outwardly from the inner edge thereof.

2. The method of forming a sheet metal fastener which consists in forming a pair of laterally spaced parallel cuts in a sheet metal piece, pressing the metal between the cuts to one side of the piece in generally triangular form, punching a hole centrally of the pressed-out portion so that the wall of the hole forms with the adjacent outer wall of the pressed portion an angle of the order of 60° and effecting a severance thereof to form a pair of prongs or tongues, and then inverting by pressing the tongues to a similar position on the opposite side of the sheet metal piece, whereby the edge portion of each tongue inclines upwardly and laterally from the free edge forming an angle of the order of 60 degrees for biting engagement with a stud.

3. The method of forming a sheet metal fastener which consists in forming a pair of laterally spaced parallel cuts in a sheet metal piece, pressing the metal between the cuts to one side of the piece in generally triangular form, punching a hole centrally of the pressed-out portion so that the wall of the hole forms with the adjacent outer wall of the pressed portion an angle of the order of 60° and effecting a severance thereof to form a pair of prongs or tongues, and then inverting by pressing the tongues to a position on the opposite side of the sheet metal piece so that one tongue is moved a greater distance than the other and imparting a shape of a partial helix to the punched edge portions for screw thread engagement, whereby the edge portion of each tongue inclines upwardly and laterally from the free edge forming an angle of the order of 60 degrees to project between the threads of a screw applied to the fastener.

4. The method of forming a sheet metal fastener which consists in forming a pair of laterally spaced parallel cuts in a sheet metal piece, pressing the metal between the cuts to one side of the piece in generally triangular form, punching a diamond-shaped hole centrally of the pressed-out portion so that the wall of the hole forms with the adjacent outer wall of the pressed portion an angle of the order of 60° and effecting a severance thereof to form a pair of notched end prongs or tongues, and then inverting by pressing the tongues to a similar position on the opposite side of the sheet metal piece, whereby the edge portion of each tongue inclines upwardly and laterally from the free edge forming an angle of the order of 60 degrees for biting engagement with a stud.

5. The method of forming a sheet metal fastener for self-locking engagement by a screw consisting in countersinking a conical protuberance from a sheet metal piece, punching out a round hole at the top of the protuberance in a direction at right angles to the plane of the sheet metal piece, punching out a slot extending from the edge of the hole to the base of the protuberance, and thereafter inverting by pressing the protuberance to a similar position on the other side of the sheet metal piece and forming the edge of the hole into a helix, whereby the edge of the hole provides an angular surface inclining outward laterally from the inner surface to the outer surface of the sheet metal piece at an angle less than 90°.

6. The method as claimed in claim 5 in which the slotting and countersinking-hole punching steps are separate and follow each other in that order.

7. The method as claimed in claim 5 in which the slotting, countersinking and hole punching are carried out in a single step.

8. The method of making a sheet metal fastener which consists in pressing a conical protuberance having generally flat walls from a sheet metal piece, punching a round hole in the apex of the protuberance in such manner that the edge of the hole is at right angles to the horizontal, forming a radial slot to sever the protuberance, and by the use of dies pressing the protuberance in a reverse direction to a similar position on the other side of the piece, thereby to move the hole edge to a position disposed at less than 90° to the horizontal and to form such edge into helical form for thread engagement.

References Cited in the file of this patent

UNITED STATES PATENTS

| | | |
|---|---|---|
| 1,977,861 | Pond | Oct. 23, 1934 |
| 2,096,387 | Tinnerman | Oct. 19, 1937 |
| 2,169,056 | Place | Aug. 8, 1939 |
| 2,383,133 | Kost | Aug. 21, 1945 |
| 2,441,580 | Mageoch | May 18, 1948 |
| 2,799,202 | Patten | July 16, 1957 |
| 2,831,388 | Collins | Apr. 22, 1958 |
| 2,901,938 | Van Buren | Sept. 1, 1959 |